(12) United States Patent
Leigh et al.

(10) Patent No.: US 11,678,019 B2
(45) Date of Patent: Jun. 13, 2023

(54) USER INTERFACE (UI) ENGINE FOR CLOUD UI RENDERING

(71) Applicant: Synamedia Limited, Staines Upon Thames (GB)

(72) Inventors: Anthony Leigh, Workingham (GB); Elyashiv Zalevsky, Tzur Hadassah (IL); Peter Benjamin Matthews, Basingstoke (GB)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/234,292

(22) Filed: Apr. 19, 2021

(65) Prior Publication Data
US 2022/0337908 A1 Oct. 20, 2022

(51) Int. Cl.
| H04N 21/472 | (2011.01) |
| G06F 3/04842 | (2022.01) |
| G06F 9/451 | (2018.01) |
| H04N 21/433 | (2011.01) |

(52) U.S. Cl.
CPC ....... *H04N 21/472* (2013.01); *G06F 3/04842* (2013.01); *G06F 9/451* (2018.02); *H04N 21/4331* (2013.01)

(58) Field of Classification Search
CPC .. H04N 21/472; H04N 21/4331; G06F 9/451; G06F 3/04842
See application file for complete search history.

(56) References Cited

U.S. PATENT DOCUMENTS

| 2012/0324358 A1* | 12/2012 | Jooste | G06F 9/54 |
| | | | 715/733 |
| 2014/0092254 A1* | 4/2014 | Mughal | H04N 21/23424 |
| | | | 348/598 |
| 2014/0366057 A1* | 12/2014 | Brockmann | H04N 21/4316 |
| | | | 725/37 |
| 2017/0287443 A1* | 10/2017 | Boyce | G09G 5/006 |
| 2018/0176097 A1 | 6/2018 | Russell et al. | |
| 2020/0073905 A1* | 3/2020 | Deng | H04L 29/08 |
| 2020/0097568 A1* | 3/2020 | Rekhi | G06F 16/583 |

FOREIGN PATENT DOCUMENTS

WO 2016028496 A1 2/2016

OTHER PUBLICATIONS

Combined Search and Examination Report under Sections 17 and 18(3) dated Jan. 11, 2023, GB Patent Application No. 2208181.4, pp. 1-11.

* cited by examiner

*Primary Examiner* — Sumaiya A Chowdhury
(74) *Attorney, Agent, or Firm* — Fernando & Partners, LLP

(57) ABSTRACT

Techniques for cloud user interface (UI) rendering in a virtual set top system is performed by a UI engine on a server or a cloud platform. The method includes receiving a request for a UI, where the request includes a state associated with the UI and the request. The method further includes identifying, based at least in part on the first state, UI element(s) and/or interactions associated with the UI. The method also includes determining whether or not UI object(s) corresponding to the UI element(s) and/or the interactions exist in a cache. The method additionally includes generating the UI using the UI object(s) upon finding the UI object(s) in the cache. The method further includes rendering the UI upon not finding the UI object(s) in the cache, including rendering the UI element(s) and/or the interaction(s) as the UI object(s) and storing the UI object(s) in the cache.

20 Claims, 9 Drawing Sheets

700

(A) — 752

Storing the one or more UI objects in the cache includes deriving from the first state a user requesting the UI, a screen associated with the UI, a UI element highlighted on the screen, and an input key triggering the first request, and indexing the one or more UI objects in the cache based on a composite of the user requesting the UI, the screen associated with the UI, the UI element highlighted on the screen, and the input key triggering the first request Generating the UI using the one or more UI objects in accordance with the determination that the one or more UI objects exist in the cache includes obtaining the one or more UI objects from the cache using the composite of the user requesting the UI, the screen associated with the UI, the UI element highlighted on the screen, and the input key triggering the first request, and providing the one or more UI objects for video playout of the UI — 754

(B) — 760

The one or more UI objects include a video sequence corresponding to the one or more interactions Storing the one or more UI objects in the cache includes determining whether the video sequence is cacheable based at least in part on the first state, and storing the video sequence in the cache in accordance with a determination that the video sequence is cacheable — 762

Determine playout characteristics of the video sequence based at least in part on the first state, and compose the video sequence according to the playout characteristics — 764

(C)

Determining whether or not the UI is associated with a video; and composite the UI with a plurality of frames in the video in accordance with a determination that the UI is associated with the video — 770

Compositing the UI with the video includes identifying a first insertion point in the plurality of frames based on the first state, and overlay the one or more UI objects over the plurality of frames obtained from a video buffer starting from the first insertion point — 772

Receive a second request for the UI, where the second request includes a second state associated with the UI and the second request; in response to receiving the second request, identify a second insertion point in the plurality of frames based on the second state and overlay the one or more UI objects over the plurality of frames obtained from the video buffer starting from the second insertion point — 774

Figure 7B

USER INTERFACE (UI) ENGINE FOR CLOUD UI RENDERING

TECHNICAL FIELD

The present disclosure relates generally to virtualizing a set top system for multimedia content delivery and, more specifically, to a user interface (UI) engine in a virtual set top system for cloud UI rendering.

BACKGROUND

The television industry is increasingly moving processing for video services away from client devices in millions of homes and moving such processing into the cloud. One naïve implementation of moving user interface (UI) rendering into the cloud is to configure one renderer in the cloud for each user to generate a video of the experience (e.g., the user interface and the media content) and stream the video to each home. However, such an approach is impractical and cannot scale, especially when the cloud platform serves millions of users. Moreover, many user behaviors on TV UIs are repetitive. Thus, generating the same UI over and over from common data in each of the renderers does not utilize cloud resources efficiently. As such, many previously existing cloud UI rendering systems face the challenge of delivering high quality user experience at a low cost.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 7A and 7B are flowcharts illustrating a cloud UI rendering method, in accordance with some embodiments.

Figure 1:
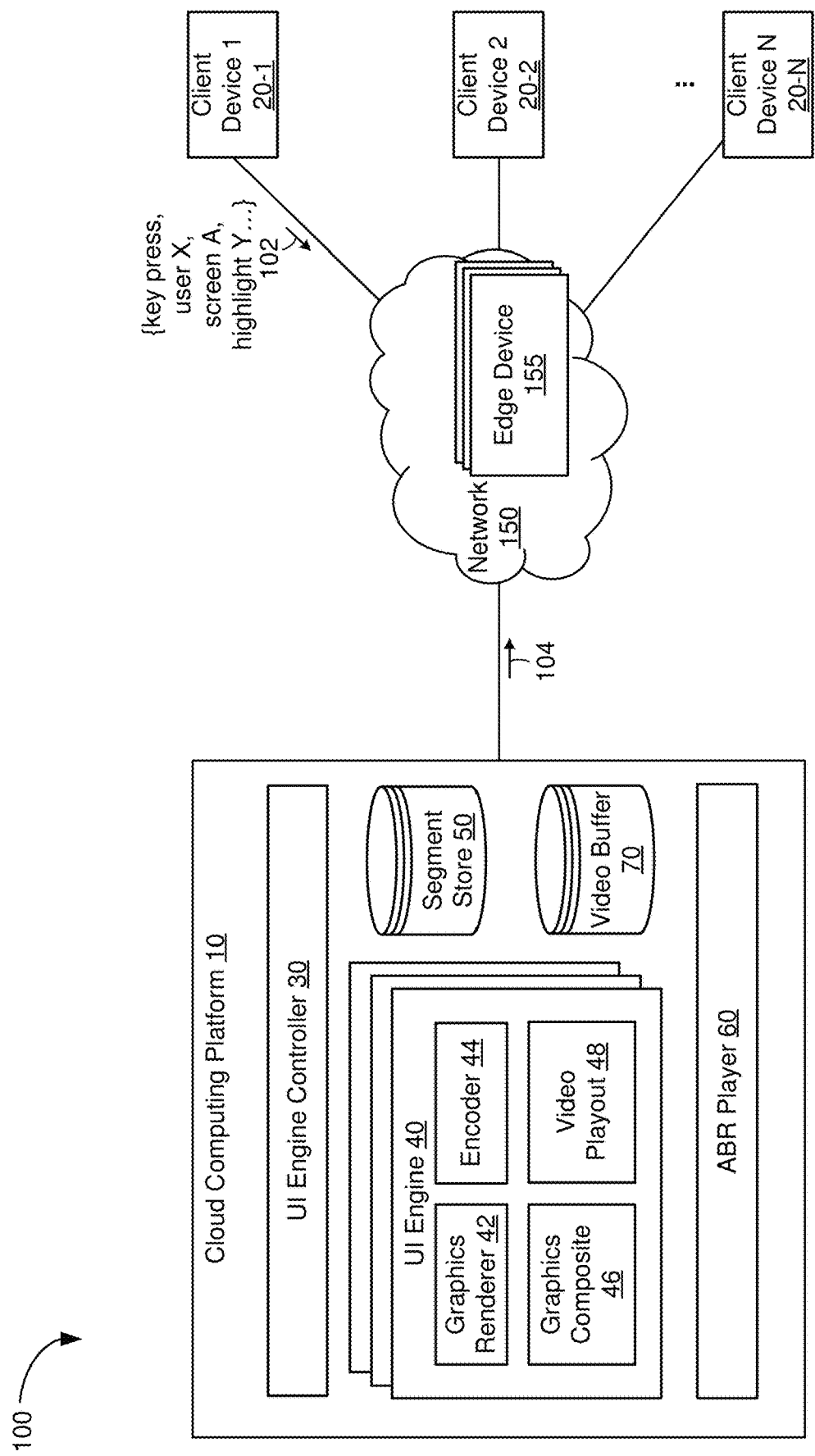
FIG. 1 is a block diagram of an exemplary virtual set top system for media content delivery, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Television user interfaces (UIs) are well suited to segmentation and caching rendered segments corresponding to UI elements and/or user interactions. Once cached, the rendered segments corresponding to common UI displays and/or user interactions for common activities (e.g., displaying home screen, TV guide, video-on-demand (VOD) store, etc.) would have a high cache hit ratio and can be reused many times. A virtual set top system described herein includes a pool of UI engines in the cloud that shares a cache to store rendered TV UIs in the cloud for set-top-boxes (STBs). A respective cloud UI engine in accordance with some embodiments renders UI elements and/or UI transitions into UI objects and reuses and/or shares the rendered UI objects with other copies of UI engines. In some embodiments, the rendered UI objects correspond to not only images, but also short sequences of video segments representing UI transitions. Thus, through caching and reusing the UI objects, the cloud UI engine described herein renders UIs faster for multiple watch sessions. As a result, the virtual set top system described herein improves user experiences and lowers cost.

In accordance with various embodiments, a cloud UI rendering method is performed at a device (e.g., a UI engine on a server or within a cloud platform) with one or more processors and a non-transitory memory. The method includes receiving a first request for a UI, where the first request includes a first state associated with the UI and the first request. The method further includes identifying, based at least in part on the first state, at least one of one or more UI elements or one or more interactions associated with the UI. The method also includes determining whether or not one or more UI objects corresponding to at least one of the one or more UI elements or the one or more interactions exist in a cache. The method additionally includes generating the UI using the one or more UI objects in accordance with a determination that the one or more UI objects exist in the cache. The method further includes rendering the UI in accordance with a determination that the one or more UI objects do not exist in the cache, including rendering at least one of the UI elements or the one or more interactions as the one or more UI objects and storing the one or more UI objects in the cache.

Example Embodiments

In accordance with some embodiments, a virtual set top system described herein includes a pool of user interface (UI) engines that shares a cache and renders TV UIs in the cloud for set-top-boxes (STBs). A respective UI engine utilizes rendered UI objects stored in the shared cache to improve cloud UI rendering efficiency. When the UI engine receives state information along with a request for a UI, the UI engine segments the UI based at least in part on the state information. The segments include not only UI elements such as images, posters, and other UI artifacts, but also transitions from one UI to another. The UI engine then locates UI objects in the shared cache using a composite key derived from the state information. In the case of not finding any UI objects in the shared cache corresponding to the UI element(s) and/or the transitions, the UI engine renders the UI, stores the rendered UI object(s) associated with the UI, and tags the rendered UI object(s) with the composite key for indexing. On the other hand, upon finding one or more UI objects corresponding to the UI element(s) and/or the transitions, the UI engine reuses the pre-rendered UI object(s) for fast cloud UI rendering. In some embodiments, the UI engine utilizes the cached UI objects for generating unique overlays over a common video. Using the shared UI objects, the UI engine efficiently generates and provides personalized UIs to different clients for improved user experience. Accordingly, the cloud UI engine described herein enables fast cloud UI rendering at a low cost.

Reference is now made to FIG. 1, which is a block diagram of an exemplary virtual set top system 100 for media content delivery in accordance with some embodiments. The media content (also referred to hereinafter as "multimedia content", "media content item(s)", or "content") can include any multimedia data, such as visual data, audio data, and/or text, etc. In some embodiments, the virtual set top system 100 includes a cloud computing platform 10 that obtains media content from a content store, such as recorded content and/or a live broadcast. The cloud computing platform 10 renders UIs for a plurality of client devices 20, e.g., client device 1 20-1, client device 2 20-2, . . . , client device N 20-N, etc., and delivers both the media content obtained from the content store and the rendered UIs via a network 150 to the plurality of client devices 20. In some embodiments, the network 150 further includes a plurality of edge devices 155 and/or content delivery networks (not shown) that bring computation and data storage closer to the plurality of client devices 20.

In some embodiments, to render the UIs for the plurality of client devices 20, the cloud computing platform 10 includes a UI engine controller 30 that maintains cloud computing resources, such as virtual machine(s) and/or pool(s) of UI engines 40. The virtual machine(s) run on top of hardware, e.g., CPU(s) and/or GPU(s), and execute programs or instructions for UI rendering. In some embodiments, each of the virtual machines corresponds to one application for UI rendering. An application as used herein refers to an executable program (or a listing of instructions for execution) that defines a UI for display on a display device. In some embodiments, each of the virtual machines hosts a pool of UI engines 40 that runs as multiple instances of the application and serves as virtual set-top-boxes (STBs) for the plurality of client devices 20.

The UI engine controller 30 receives a request 102 for a UI from a respective client device 20. In some embodiments, session cookies are also sent along with the request 102. The information in the session cookies along with the request 102 indicates user actions such as a key press, user X making the request 102, the UI screen being displayed, a UI element being highlighted, etc. In some embodiments, the UI engine controller 30 derives state information from the request 102 and/or the session state cookies. The state information includes, but is not limited to, a UI being displayed, a UI being requested, user interactions, network information (e.g., client IP), geographical information, a client user agent, a timestamp, a household identifier, a device identifier, a device type, and/or media content item identifier, etc. Based on the state information, the UI engine controller 30 allocates a UI engine 40 and establishes a connection between the client 20 and the UI engine 40. Once the connection is established, the selected UI engine 40 renders the UI in the cloud computing platform 10 for the client 20 and the rendered UI is then combined with the media content associated with the UI and delivered in one or more streams 104 to the client device 20 over the connection.

Upon receiving the media content and the rendered UI, client device 20 reconstructs (e.g., decodes) the images and properly displays the result. When multiple UI requests are received from the client devices 20, the cloud computing platform 10 simultaneously renders the UIs for the multiple client devices 20 in accordance with some embodiments. From the user perspective at each of the client devices 20, the user interacting with a client device 20 perceives the application that they are interacting with as being executed in the client environment, whereas the actual execution is taking place on the cloud computing platform 10. As such, a minimal subset of support functions (e.g., the implementation of a return channel for user input and/or video stream decoding) on each of the client devices 20 is sufficient to play the UI and/or the media content, and that the complex function of UI rendering is done by the cloud computing platform 10. Thus, even a very low-cost device, with the common capability of displaying videos, can realize high quality and low latency user experience.

In some embodiments, the pool of UI engines 40 includes graphics renderers 42 for rendering one or more UI elements into rendered UI objects, encoders 44 for encoding UI interactions associated with the requested UI into short sequences of segments, graphics composites modules 46 (also referred to hereinafter as the graphics composites 46) for overlaying UI objects on videos, and video playouts 48 for recording or playing the short sequences of segments. In some embodiments, the cloud computing platform 10 includes a segment store 50 for storing rendered UI objects. In some embodiments, the cloud computing platform 10 includes a video buffer 70 for storing a common source of decoded video frames that would be composited with the rendered UI objects for generating personalizing UIs over media assets.

It should be noted that although a single cloud computing platform 10 is illustrated in FIG. 1, the virtual set top system 100 may include one or more cloud computing platforms 10 and the multiple components in the cloud computing platform 10 can be distributed and/or not co-located. For the sake of simplicity, the subject matter will be described hereinafter for the most part with reference to a single cloud computing platform 10. Further, one or more components and/or functions of the cloud computing platform 10 may be distributed to the edge devices 150. As such, the virtual set top system 100 can include more, less, and/or different elements than shown in FIG. 1. Additionally, each of the component in the virtual set top system 100 can include appropriate hardware, software, and/or firmware to perform the operations attributed to the element herein. Operation(s) attributed to an element in the virtual set top system 100 herein should not be considered binding and in some embodiments, other element(s) in the exemplary system 100 may additionally or alternatively perform such operation(s).

Figure 2:
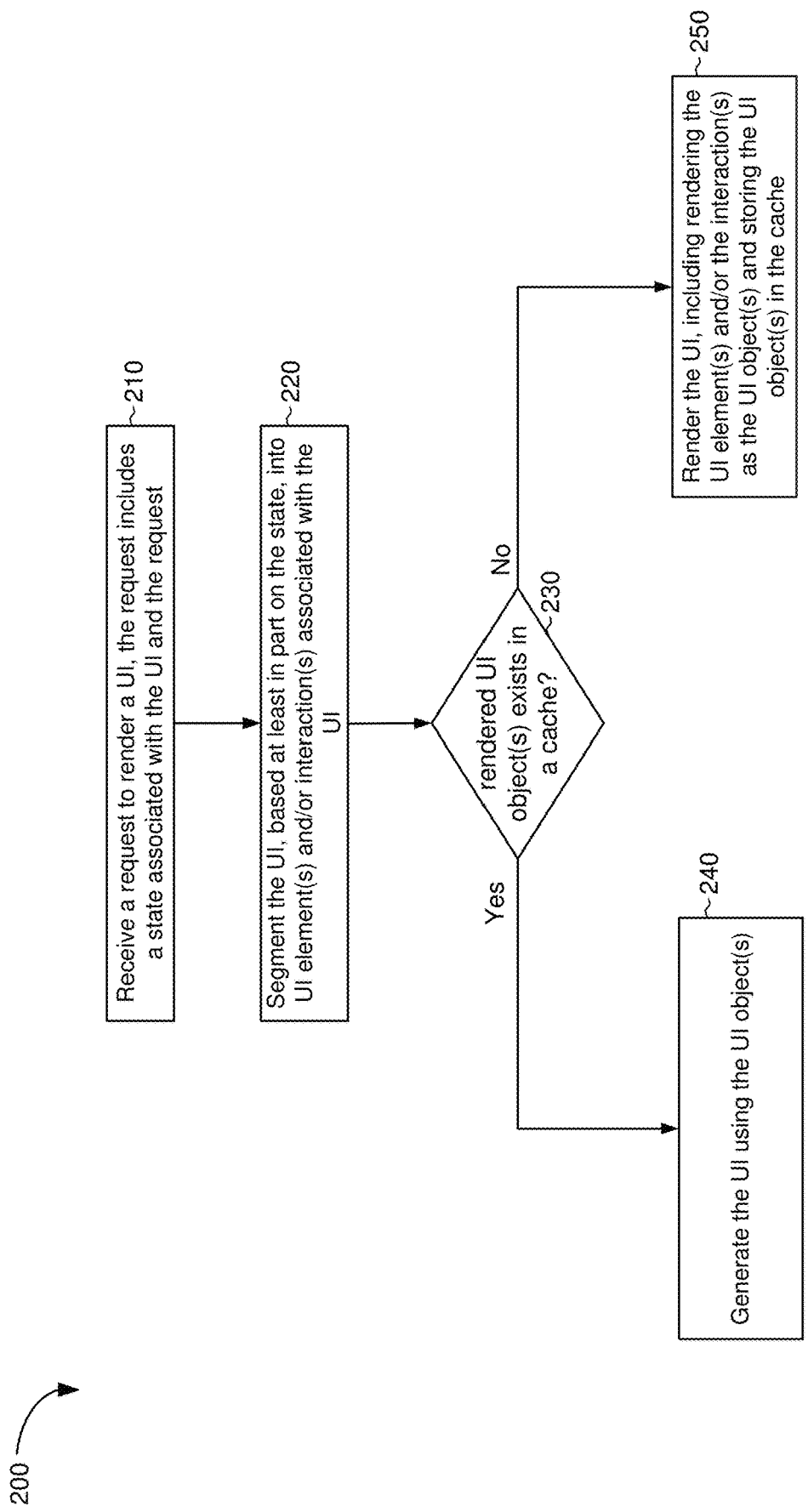
FIG. 2 is a flowchart illustrating a cloud UI rendering method, in accordance with some embodiments.

FIG. 2 is a flowchart illustrating a method 200 of using rendered UI objects for cloud UI rendering in accordance with some embodiments. In some embodiments, the method 200 is performed by a UI engine, e.g., a UI engine 40 in the pool of the UI engines 40 in FIG. 1. As represented by block 210, the method 200 includes receiving a request for a UI (e.g., a TV UI), where the request includes a state associated with the UI and the request. For example, as shown in FIG.

1, the state information can indicate that a user pressed a key to highlight a section of a screen. As represented by block 220, the method 200 further includes segmenting the UI, based at least in part on the state, into at least one of one or more UI elements (e.g., images, posters, and/or other UI artifacts) or one or more interactions associated with the UI (e.g., a key press that would trigger a transition from one UI to another). As represented by block 230, the method 200 also includes determining whether or not one or more UI objects corresponding to at least one of the one or more UI elements or the one or more interactions exist in a cache. Upon determining that the one or more UI objects exist in the cache ("Yes"-branch from the decision block 230), as represented by block 240, the UI engine generates the UI using the one or more UI objects without re-rendering the UI. On the other hand, upon determining that the one or more UI objects do not exist in the cache ("No"-branch from the decision block 230, as represented by block 250, the UI engine renders the UI, including rendering at least one of the UI elements or the one or more interactions as the one or more UI objects and storing the one or more UI objects in the cache. As such, using the cloud UI rendering method 200, the pool of UI engines can render the UI once and reuse the rendered UI many times to improve the efficiency of cloud UI rendering.

Figure 3:
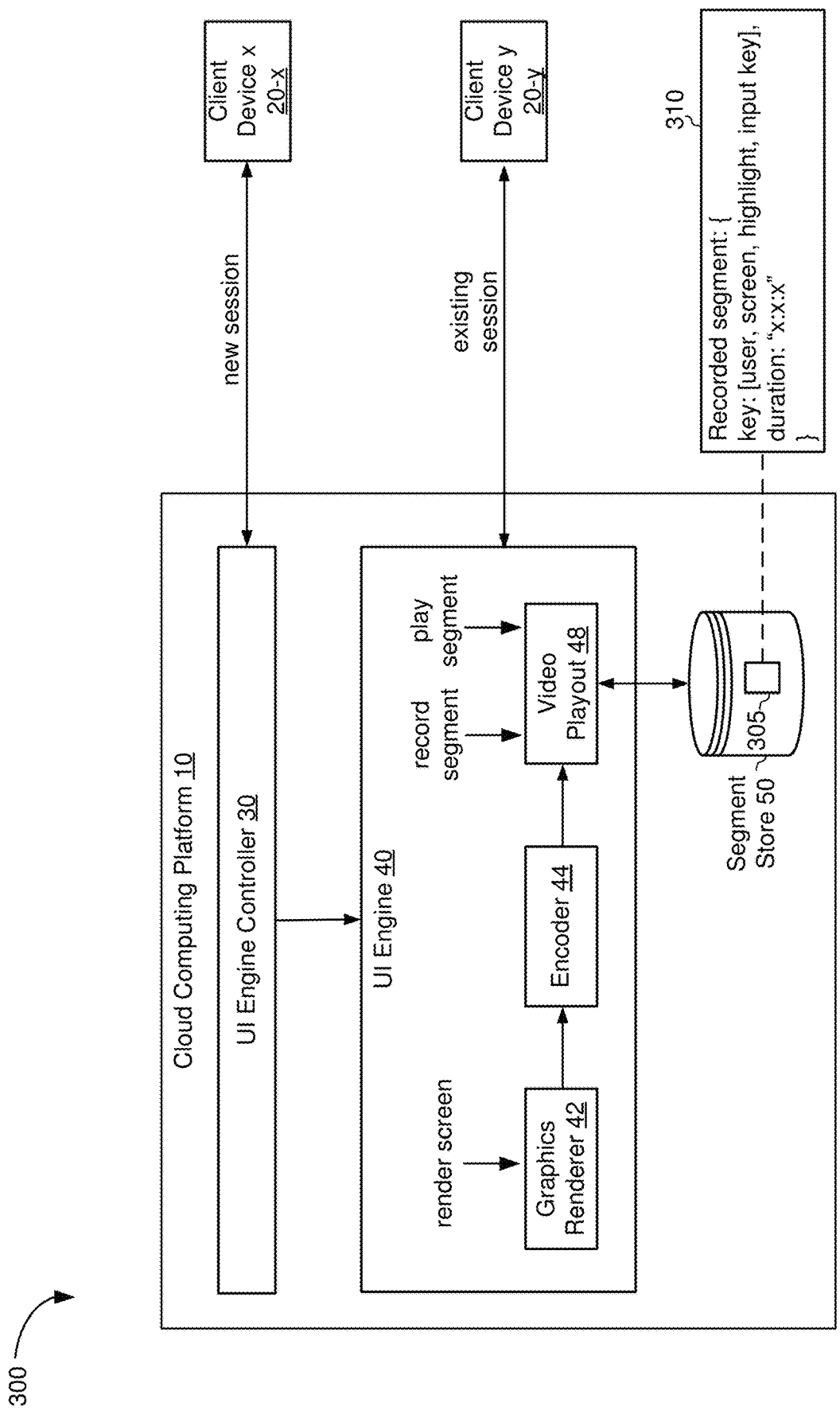
FIG. 3 is a block diagram illustrating recording and playing out UI objects for cloud UI rendering, in accordance with some embodiments.

FIG. 3 is a block diagram 300 illustrating recording and playing out UI objects for cloud UI rendering in accordance with some embodiments. As explained above, many user behaviors on TV UIs are predictable and repeated. Thus, TV UIs can be broken up into segments and reusing rendered segments reduces redundancy. In some embodiments, the segments correspond to UI artifacts as well as the transitions between the UI screens. Once segmented, the segments can then be rendered once, cached, and replayed many times. Depending on the UI screens, the segments can be personal to a user or common for many users. For example, the action menu for a movie may be the same for all clients. Because the rendered UI objects in the cache are ready to play, the transition time from providing one UI screen to another is shorter. Further, because playing the rendered UI objects takes less processing time than rendering the segments, the time saved from rendering the segments can be used for other tasks, such as preparing an active UI that may be personal to a user. Additionally, the delivery of pre-rendered video to the client device has the benefit of providing more reliable and consistent user experience than real time streaming of content, where different client devices (e.g., with different capacities and configurations) may interpret the rendering commands differently.

When the cloud computing platform 10 receives a request for a UI from client device x 20-x during a watch session, the UI engine controller 30 receives session cookies along with the request. Based on the state information in the session cookies along with the request, the UI engine controller 30 determines if there is an existing connection for the UI rendering. Upon determining that there is no existing connection, the UI engine controller 30 establishes a connection by assigning the UI engine 40 to render the UI for the watch session. In another example, when the cloud computing platform 10 receives a request for a UI from client device y 20-y during a watch session, the UI engine controller 30 receives session cookies along with the request. Based on the state information in the session cookies along with the request, the UI engine controller 30 determines that there is an existing connection between the UI engine 40 and client device y 20-y. As such, the UI engine controller 30 allows the UI engine 40 to render the UI for client device y 20-y over the existing connection.

Upon being assigned to render the UI, the UI engine 40 determines if one or more UI elements of the requested UI and/or one or more interactions associated with the UI are candidates for caching and whether one or more UI objects exist in the cache that can be reused. If the one or more UI elements and/or the one or more interactions are cacheable and the one or more UI objects corresponding to the one or more UI elements and/or the one or more interactions do not exist in the cache, the UI engine 40 instructs the graphics renderer 42 to render, instructs the encoder 44 to encode the UI interactions into short video sequence(s), and instructs the video playout 48 to record the short video sequence(s) in accordance with some embodiments. The recorded short video sequence(s) are then stored in the segment store 50 to be reused. On the other hand, upon determining that the corresponding UI object(s) already exist in the segment store 50, the UI engine 40 instructs the video playout 48 to retrieve the UI object(s) from the segment store 50 and play the UI object(s) for UI composition.

In some embodiments, the UI objects stored in the segment store 50 are tagged to facilitate lookup. The tags include the state information derived from the session cookies along with the UI requests. For instance, once a connection is established and the UI engine 40 obtains the state information, e.g., a user while watching a screen pressed a key to highlight a tile, the UI engine 40 generates a rendered UI object 305 in response to the request and tags the rendered UI object 305 with metadata 310 and stores the UI object 305 in the segment store 50. The UI object 305 corresponds to the UI interactions and the metadata 310 includes the state information and/or properties of the UI object 305, e.g., user, screen, highlight, key, and duration of the video sequence, etc. The metadata 310 enables indexing of the UI objects in the segment store 50 to facilitate searching of the UI objects. For example, a composite key comprising a tuple of [user, screen, highlight, input key] can be used for indexing and locating the UI objects in the segment store 50.

In some embodiments, to improve the cloud storage utilization, the UI objects stored in the segment store 50 are kept according to ranking, e.g., by importance, cache hit rates, and/or usages. For example, the least frequently used UI objects or the UI objects with a usage frequency less than a threshold may be removed from the segment store 50 after a threshold amount of time. In another example, the least recently used UI objects or the UI objects that have not been used for a threshold amount of time may be removed from the segment store. Removing such UI objects frees up storage space and makes room for other UI objects with higher cache hit rates.

It should be noted that although FIGS. 1 and 3 illustrate the segment store 50 as a separate component from the UI engine(s) 40, the segment store 50 can be part of a pool of UI engines 40 hosted by a VM and shared by the pool of UI engines. In some embodiments, the segment store 50 can be local to the UI engine 40, and particularly, local to the video playout 48. In some embodiments, the segment store 50 can be on a separate virtual machine, instance, and/or device, e.g., shared by multiple virtual machines or local to the edge devices 155 (FIG. 1). Those skilled in the art will appreciate from the present disclosure that various other features and configurations have not been illustrated for the sake of brevity, and so as not to obscure more pertinent aspects of the embodiments disclosed herein.

Figure 4:
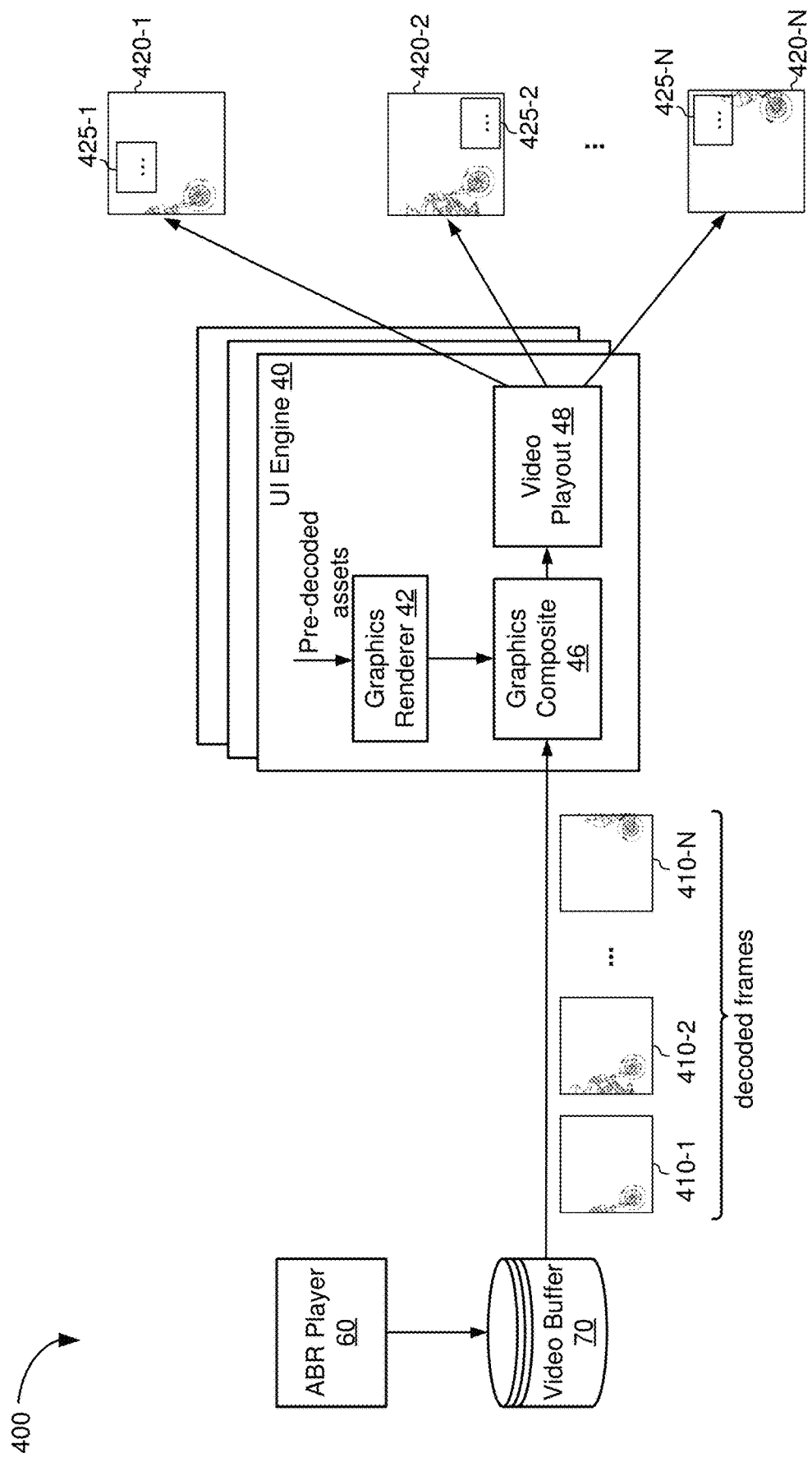
FIG. 4 is a block diagram illustrating rendering unique UIs over a common video, in accordance with some embodiments.

FIG. 4 is a diagram 400 illustrating rendering unique UIs over a common video in accordance with some embodiments. Users often request UIs when watching videos. Without disrupting the video play, a UI (e.g., a banner, a small window, a timeline, etc.) is displayed on top of the video so that the user can peek at other media content while the video is playing. The UI may be personal or unique to the user (e.g., a channel the user subscribed to) or common to many users. The video, while common to many users, may have variance in time upon being delivered and played to various client devices. For example, when streaming a live event, due to ABR states, network conditions, processing capacities of client devices, etc., the linear video frames delivered to the client devices may have various degrees of delays.

In some embodiments, the session cookies received along with the requests for UIs indicate that there is a common video playing on the screens at the time of requesting the UIs. To render the UIs over videos, the cloud computing platform described herein uses a common ABR player 60 to stream the videos to many users. As shown in FIG. 4, the pool of UI engines 40 shares the ABR player 60 so that the common video played by the ABR player 60 is shared by many UIs. In some embodiments, the cloud computing platform 10 stores a common source of decoded video frames in the video buffer 70, e.g., storing video frames for a channel for a period of approximately 10 seconds. Using the decoded video frames stored in the video buffer 70, the UI engines 40 select a frame in the video buffer 70 and instruct graphics composites 46 to composite unique UIs over the common video. The composited UIs are then played out by video playouts 48 and sent to the client devices.

When rendering UIs over a common video for many watch sessions, the UI engines 40 obtain decoded frames 410 from the video buffer 70, e.g., obtaining a bike riding video with frames 410-1, 410-2, . . . , 410-N. In some embodiments, the UI engines 40 also load pre-decoded assets, such as images, posters, or UI artifacts, into a shared graphics memory (e.g., part of the segment store 50, FIGS. 1 and 2 and/or a shared GPU memory on the VM hosting the UI engines 40) based on the UI screen to render. The graphics renderers 42 then use the pre-decoded assets to render the UI, e.g., by rendering the pre-decoded assets in a transparent or semitransparent section of the UI. The graphics renderers 42 further pass the rendered UI to the graphics composites 46 to composite unique UIs over the common video, and the unique UIs are then played out by the video playouts 48 and delivered to the clients.

In FIG. 4, the delays of playing the video in the unique UIs 420-1, 420-2, . . . , 420-N (collectively referred to hereinafter as the UIs 420) vary. The UI engines 40 obtain the pre-decoded assets and provide the pre-decoded assets to the graphics renderers 42, e.g., retrieving the same UI object such as a rendered banner from the segment store 50 (FIGS. 1 and 3) and providing the UI object to the graphics renderers 42 as the pre-decoded asset. Depending on the state information, the UI engines 40 select different frames from the decoded frames 410 and directs the graphics composites 46 to overlay the rendered UI objects at various locations on the unique UIs 420, e.g., overlaying the UI object 425-1 in the top portion of frame 410-1 to composite the UI 420-1, overlaying the UI object 425-2 at the bottom of frame 410-2 to composite the UI 420-2, . . . , overlaying the UI object 425-2 on the right side of frame 410-3 to composite the UI 420-N, etc. Thus, when playing one common video, the UI engines 40 can generate many unique UIs efficiently using the shared UI objects.

Figure 5:
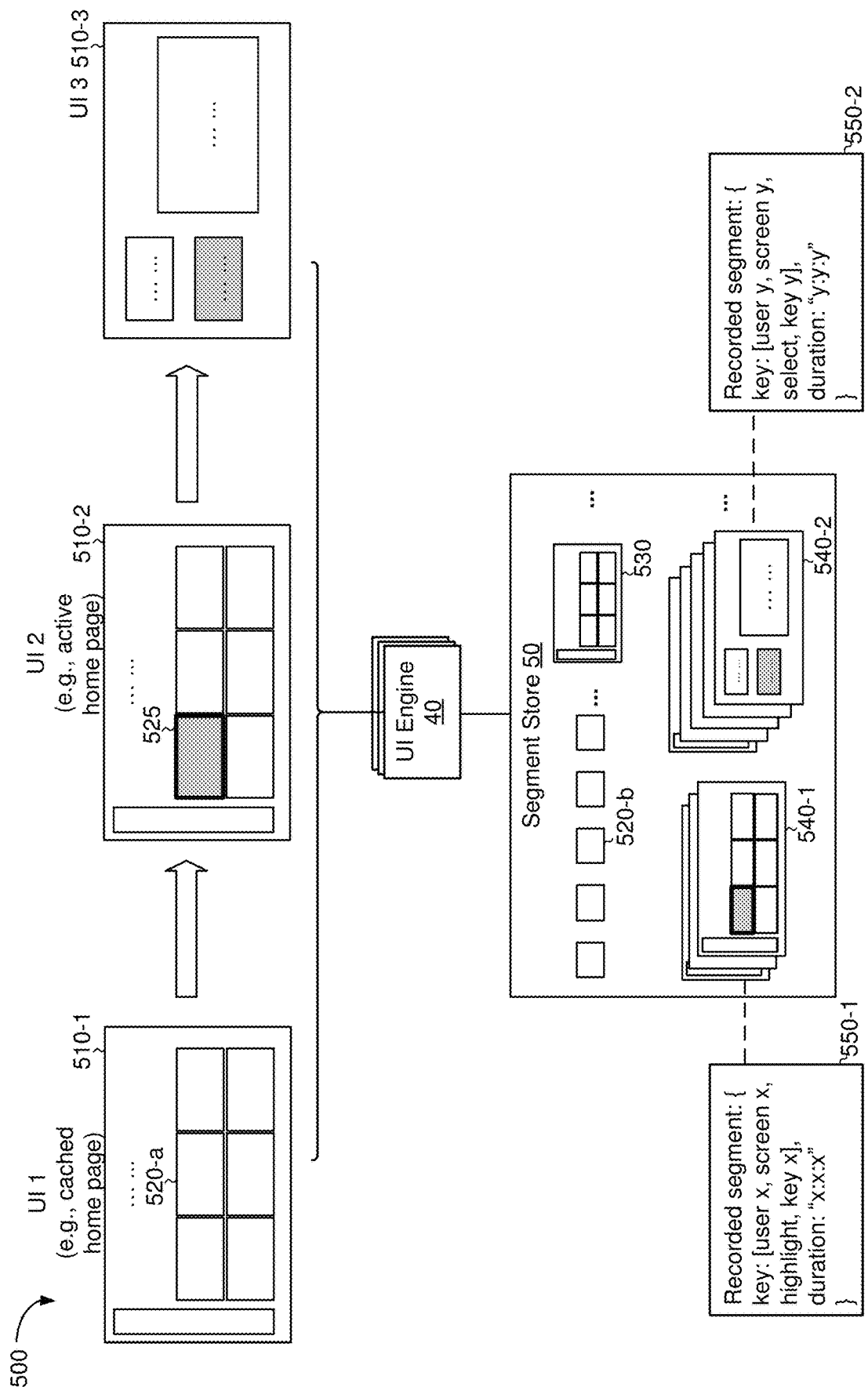
FIG. 5 is a block diagram illustrating segmenting UIs for caching, in accordance with some embodiments.

FIG. 5 is a diagram 500 illustrating segmenting UIs for cloud UI rendering in accordance with some embodiments. As explained above, the UI engines 40 segment UIs into different portions for UI rendering and determine whether to reuse an existing UI object stored in the segment store 50 or render a portion of the UI into a UI object. For example, in FIG. 5, at least a portion of a UI (e.g., UI 1 510-1) is static and common for many users, e.g., the default home page, the home page template, and/or a popular show tile 520-a. The home page UI 510-1 can also be personal to a user, e.g., with recommendations and a tile corresponding to continued watching for the user, etc. Even if the home page is personal, the personalized home page is frequently visited by the same user. Thus, a cached pre-rendered home page can have a high cache hit rate and reusing the pre-rendered home page improves rendering efficiently.

In some embodiments, the UI engines 40 render at least a portion of the UI 1 510-1 and store rendered UI objects corresponding to the portion of UI 1 510-1 in the segment store 50, e.g., storing a UI object 520-b corresponding to a tile 520-a in UI 1 510-1 and/or storing another UI object 530 corresponding to UI 1 510-1 in the segment store 50. Once rendered, the cached UI objects 520-b and 530 can be replayed many times to speed up the display of UI 1 510-1 for improved user experience.

In some embodiments, once the user starts to interact with the home page, such as highlighting a tile 525 on UI 2 510-2, the home page becomes active. The UI engines 40 obtain the state information associated with the interaction, e.g., receiving the state information along with the UI request from a client device used by user x. As described above with reference to FIG. 1, the state information indicates the user information, the client device information, network information, the UI involved, etc. Based on the state information, the UI engines 40 infer that such requests are in the same context of rendering the home page but involve the transitioning from the static home page UI 510-1 to the active home page UI 510-2. Accordingly, in some embodiments, the UI engines 40 record a video sequence 540-1 that corresponds to transitioning from static UI 1 510-1 to active UI 2 510-2. In some embodiments, the video playout 48 (FIG. 2) records the video sequence and tags the video sequence with metadata 550-1, where the metadata 550-1 indicates user x requested the UI while at screen x by pressing key x to highlight a tile and the duration of the segment 540-1, etc. In another example, in response to another UI request from user y at a client device, the UI engines 40 generate another video sequence 540-2 corresponding to the transition from UI 1 510-1 to UI 2 510-2 and then to UI 3 510-3 (collectively referred to hereinafter as the UIs 510). Further, the UI engines 40 tag the video sequence 540-2 with metadata 550-2 indicating user y requested the UI while at screen y by pressing key y to select an artifact on the screen and the duration of the video sequence 540-2, etc.

In some embodiments, the video sequence 540-1 is generated based on the state information associated with the request. In some embodiments, the state information, including the network conditions and/or the processing capacity of the client device, etc., is obtained from the client device, the edge device (e.g., the edge device 155, FIG. 1), and/or other sources in the virtual set top system. For instance, depending on the complexity of the UIs 510, the transition involved, network conditions, and/or processing capacity of the client device, the UI engines 40 render a video sequence 540-2 that is proportional to the amount of bandwidth and/or processing capacity available to the client device. In FIG. 5, the UI engines 40 may combine two or more static images and instruct the video playout to record the short video sequence 540-1, which provides a simple animation, e.g., adding swirls in the background in one or more of the frames in the video, a fading effect, and/or a 3D effect, etc. Relative to the video sequence 540-1, the video sequence 540-2 may have a longer sequence of video frames to record the more complex transition from UI 1 510-1 to UI 3 510-3 and may include animation(s) for relatively high-complexity UIs in the background and slowly fading in one or more UI elements in the foreground.

In some embodiments, in addition the duration of the video sequence 540, the UI engines 40 determines playout characteristics of the video sequence 540 based on the state information, e.g., determining the number of frames to play within the same duration, the frames to preserve, and/or the frames to drop in the video sequence 540. For example, with a good network connection, the UI engines 40 may instruct the video playout to play the video sequence 540 at a rate of 25 frames per second. When the network conditions are poor, the UI engines 40 may instruct the video playout to play the same video sequence 540 over the same duration, but with fewer frames, e.g., at a reduced rate of 12 frames per second. When the network conditions deteriorate further, the UI engines 40 may instruct the video playout to play the same video sequence 540 at a very low rate of 2 frames per second, which is similar to a simple animation based on two static images. The adaptive playout thus improves user experience by minimizing the disruption of transitioning.

Figure 6:
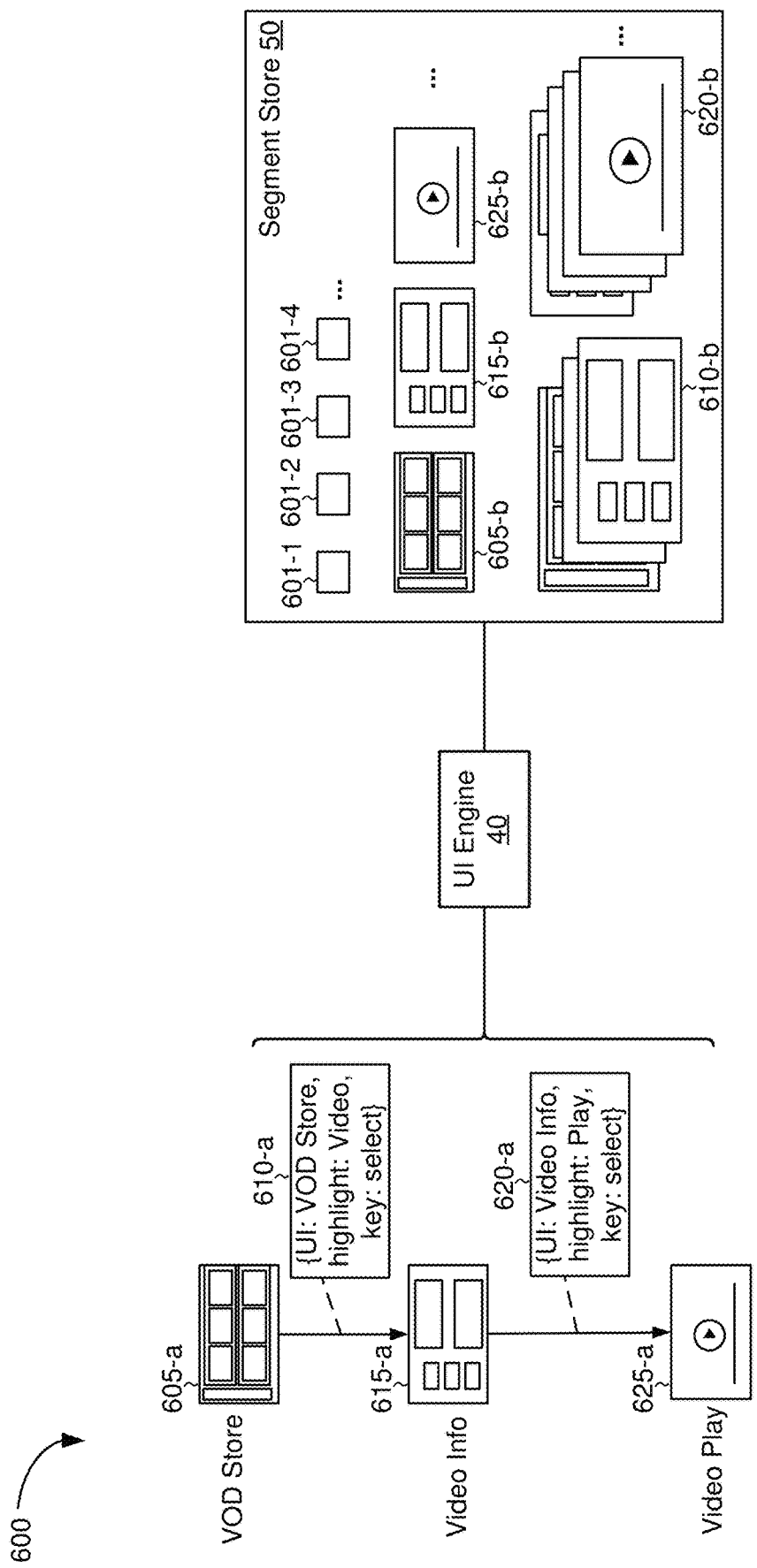
FIG. 6 is a block diagram illustrating state transitions with options for segment caching, in accordance with some embodiments.

FIG. 6 is a diagram 600 illustrating state transitions with options for segment caching in accordance with some embodiments. In FIG. 6, a VOD store screen with a UI 605-a that displays VOD offerings may be common to users or unique to a user. Similar to the home page UI 410-1 in FIG. 5, the UI engine 40 can render the VOD store UI 605-a into a UI object 605-b and the rendered UI object 605-b can be reused many times by different users and/or the same user to allow fast cloud UI rendering of the VOD store UI 605-a. Likewise, a video information screen with a UI 615-a that displays asset details and/or action menus may be common to many users (e.g., the beginning of a movie) or unique to a user (e.g., a recording saved by the user). Thus, the UI engine 40 can render the video information UI 615-a into a UI object 615-b and the rendered UI object 615-b can be reused many times by different users and/or the same user to allow fast cloud UI rendering of the video information UI 615-a. In yet another example, a video play screen with a UI 625-a that displays a playback overlay indicating duration and other metadata of the media asset may be common for many users. Further, images (e.g., a timeline), banners, posters, and/or UI artifacts on the overlay may also be common for many users. Thus, the UI engine 40 can render the video play UI 625-a into a UI object 625-b and render the UI artifacts into UI objects 601-1, 601-2, 601-3, 601-4, etc. (collectively referred to hereinafter as the UI objects 601), and the rendered UI objects 601 and 625-b can then be reused many times to allow fast cloud UI rendering of the video play UI 625-a.

In addition to rendering and caching UI elements, the UI engine 40 also determines whether the transitions among the VOD store UI 605-a, the video information UI 615-a, and/or the video play UI 625-a are cacheable based on the state information, characteristics of the UI element, and/or context of the interaction. For example, when a user selects a video from the VOD store UI 605-a to highlight the selected video, the state information 610-a indicates the VOD store UI 605-a as the UI being displayed and the user pressed a key to select a video to request transitioning into the video information UI 615-a. Based on the state information 610-a, the UI engine 40 determines whether such interactions are cacheable, e.g., determining whether pressing a key to highlight a UI element associated with video(s) is cacheable. Upon determining that the interactions are cacheable, the UI engine 40 queries the segment store 50. In the case of finding a video sequence 610-b corresponding to the interaction represented by the state information 610-a, the UI engine 40 plays the video sequence 610-b for fast UI rendering of the interaction.

In another example, in the case of not finding one or more UI objects associated with the interaction represented by the state information 620-a, the UI engine 40 records a video sequence 620-b and stores the video sequence 620-b in the segment store 50. In some embodiments, when recording the video sequence 620-b, the UI engine 40 utilizes the rendered UI objects 601, 615-b, and/or 625-b to shorten the rendering time. Further, in some embodiments, as described above with reference to FIG. 4, depending on the complexity of the UIs, the transition involved, network conditions, and/or processing capacity of the client device, the UI engine 40 renders the video sequence that is proportional to an amount of bandwidth and/or processing capacity available to the client device, e.g., recording a longer segment for more complex UIs for transmission to a client device in a fast network.

Figure 7A:
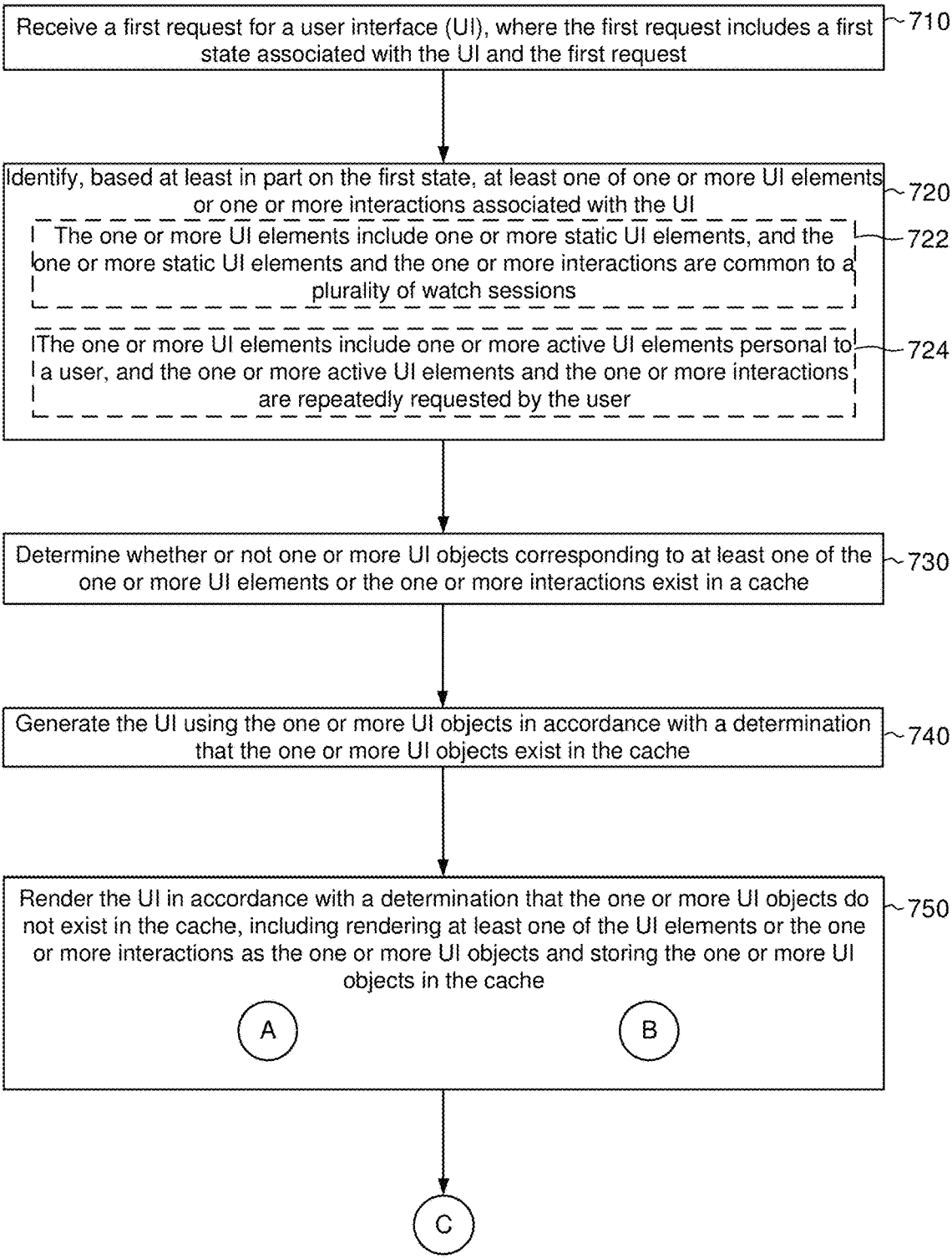

FIGS. 7A and 7B are flowcharts illustrating a method 700 of cloud UI rendering in accordance with some embodiments. In some embodiments, the method 700 is performed at a device including one or more processors and a non-transitory memory, e.g., a device hosting a respective UI engine in the pool of UI engines 40 on the cloud computing platform 10 (FIG. 1). Briefly, the method 700 includes receiving a first request for a UI, wherein the first request includes a first state associated with the UI and the first request; identifying, based at least in part on the first state, at least one of one or more UI elements or one or more interactions associated with the UI; determining whether or not one or more UI objects corresponding to at least one of the one or more UI elements or the one or more interactions exist in a cache; generating the UI using the one or more UI objects in accordance with a determination that the one or more UI objects exist in the cache; and rendering the UI in accordance with a determination that the one or more UI objects do not exist in the cache, including rendering at least one of the UI elements or the one or more interactions as the one or more UI objects and storing the one or more UI objects in the cache.

To that end, referring to FIG. 7A, the method 700 begins with the UI engine receiving a first request for a UI, where the first request includes a first state associated with the UI and the first request, as represented by block 710. For example, in FIG. 1, the state information 102 received from client device 1 20-1 indicates user X pressed a key to highlight a section Y on screen A when making the request for a UI.

The method 700 continues with the UI engine identifying, based at least in part on the first state, at least one of one or more UI elements or one or more interactions associated with the UI, as represented by block 720. In some embodiments, as represented by block 722, the one or more UI elements include one or more static UI elements, and the one or more static UI elements and the one or more interactions are common to a plurality of watch sessions. In some embodiments, as represented by block 724, the one or more UI elements include one or more active UI elements personal to a user, and the one or more active UI elements and the one or more interactions are repeatedly requested by the user. For example, in FIG. 5, a home page such as UI 1 510-1 may include a default home page static image, the home page template, or other UI artifacts that are common for many users in a plurality of watch sessions. Further, in FIG. 5, the interaction triggering the transition from UI 1 510-1 to UI 2 510-2 may be common for many users in a plurality of watch sessions. Additionally, in FIG. 5, even if the home page UI 510-1 is personal to a user, the home page UI 510-1 may be navigated to many times by the same user, and the interaction that triggers the transition from the personal home page UI 510-1 to the active home page UI 510-2 may be repeated by the same user many times.

Still referring to FIG. 7A, the method 700 continues with the UI engine determining whether or not one or more UI objects corresponding to at least one of the one or more UI elements or the one or more interactions exist in a cache, as represented by block 730. The method 700 further continues with the UI engine generating the UI using the one or more UI objects in accordance with a determination that the one or more UI objects exist in the cache, as represented by block 740. For example, in FIG. 3, the UI engine 40 instructs the video playout 40 to play out the rendered UI object(s) from the segment store 50 upon determining that the UI object(s) exist in the segment store 50. The method 700 additionally continues with the UI engine rendering the UI in accordance with a determination that the one or more UI objects do not exist in the cache, including rendering at least one of the UI elements or the one or more interactions as the one or more UI objects and storing the one or more UI objects in the cache, as represented by block 750. For example, in FIG. 3, the UI engine 40 instructs the graphics renderer 42 to render the screen, instructs encoder 44 to encode the rendered screen, and instructs the video playout 48 to record the segment and store the recorded segment in the segment store 50.

Turning to FIG. 7B, in some embodiments, as represented by 752, storing the one or more UI objects in the cache includes deriving from the first state a user requesting the UI, a screen associated with the UI, a UI element highlighted on the screen, and an input key triggering the first request, and indexing the one or more UI objects in the cache based on a composite of the user requesting the UI, the screen associated with the UI, the UI element highlighted on the screen, and the input key triggering the first request. Further in such embodiments, as represented by block 754, generating the UI using the one or more UI objects in accordance with the determination that the one or more UI objects exist in the cache includes obtaining the one or more UI objects from the cache using the composite of the user requesting the UI, the screen associated with the UI, the UI element highlighted on the screen, and the input key triggering the first request, and providing the one or more UI objects for video playout of the UI.

For example, in FIG. 3, the rendered UI object 305 stored in the segment store 50 is tagged with the metadata 310 and indexed with a composite key comprising the user information, the screen displayed at the time of the request, the UI element being highlighted, and the input key. Further, as explained above with reference to FIG. 3, the UI engine 40 receives session cookies along with the request and derives the state information so that the UI engine 40 can look up the segment store 50 to determine if a rendered UI object exists in the segment store 50. Upon determining that the one or more UI objects exist in the segment store 50, the UI engine 40 instructs the video playout 48 to play out the one or more UI objects.

Still referring to FIG. 7B, as represented by block 760, in some embodiments, the one or more UI objects include a video sequence corresponding to the one or more interactions. For example, in FIG. 5, the UI objects 540-1 and 540-2 are segments that correspond to UI interactions, which cause transitioning among UI 1 510-1, UI 2 510-2, and UI 3 510-3. In another example, in FIG. 6, the UI objects 610-b and 620-b are segments that correspond to UI interactions, which cause transitioning among VOD store UI 605-a, video information UI 615-a, and video play UI 625-a.

In such embodiments, as represented by block 762, storing the one or more UI objects in the cache includes determining whether the video sequence is cacheable based at least in part on the first state, and storing the video sequence in the cache in accordance with a determination that the video sequence is cacheable. For example, in FIG. 6, when a user selects a video from the VOD store UI 605-a to highlight the selected video, the state information 610-a indicates the VOD store 610 as the UI being displayed and the user pressed a key to select a video to request transitioning into the video information UI 615-a. Based on the state information 610-a, the UI engine 40 determines whether such interactions are cacheable and whether one or more UI elements in the VOD store UI 605-a and/or the video information UI 615-a are cacheable. In some embodiments, various UI elements within a UI are associated with a flag indicating whether the UI elements are cacheable.

Further in such embodiments, as represented by block 764, the method 700 further includes determining playout characteristics of the video sequence based at least in part on the first state, and composing the video sequence according to the playout characteristics. In some embodiments, the playout characteristics include, but not limited to, the segment playout duration, the types of animation, the number of frames to play, the frames to preserve during the playout, and/or the frames to drop, etc. As such, the UI engine records a longer video sequence for complex transitions and a shorter video sequence for simple transitions. Alternatively, the UI engine instructs the video playout to play less frames and/or at a slower frame rate for a slow network connection and play more frames and/or at a faster frame rate for a fast network connection.

For example, in FIG. 5, the segment 540-1 has a duration x:x:x that may be shorter than the segment 540-2, which has a duration y:y:y. The difference in duration and/or other playout characteristics may be due to the complexity of the UIs 510, the transitions involved, network conditions, and/or processing capacity of the client device. Accordingly, a shorter video sequence or less frames per second to play may combine two or more static images to provide a simple animation for simple UIs, simple transitions, low network connectivity, and/or low client device processing capacity. Conversely, a longer segment video or more frames per second to play may include more complex animation for complex UIs, complex transitions, high speed network connections, and/or a client device with sufficient processing capacity.

Still referring to FIG. 7B, in some embodiments, as represented by block 770, the method 700 further includes determining whether or not the UI is associated with a video. In accordance with a determination that the UI is associated with the video, the method 700 includes compositing the UI with a plurality of frames in the video. In such embodiments, as represented by block 772, compositing the UI with the video includes identifying a first insertion point in the plurality of frames based on the first state, and overlaying the one or more UI objects over the plurality of frames obtained from a video buffer starting from the first insertion point in accordance with some embodiments. Further in such embodiments, as represented by block 774, the method 700 further includes receiving a second request for the UI, where the second request includes a second state associated with the UI and the second request. In response to receiving the second request, the method 700 further includes identifying a second insertion point in the plurality of frames based on the second state and overlaying the one or more UI objects over the plurality of frames obtained from the video buffer starting from the second insertion point.

For example, as shown in FIG. 4, due to various delays, the common video playing on the screens 420-1, 420-2, and 420-3 have various delays, e.g., the screen 420-1 is playing the frame 410-1 showing a bicycle entering the scene, the screen 420-2 is playing the frame 410-2 showing the rider on the bicycle entering the scene, and the screen 420 is playing the frame 410-N showing the rider on the bicycle exiting the scene. As such, the UI engines 40 retrieve the frames 410 of the common video from the video buffer 70, which is managed by the shared ABR player 60. Further, the UI engines select the frame 410-1 for overlaying the banner 425-1, select the frame 410-2 for overlaying the banner 425-2, and select the frame 410-N for overlaying the banner 425-N. Thus, using the same set of decoded frames 410 stored in the shared video buffer 70 and the same pre-decoded banner object, different UIs 420-1, 420-2, and 420-N are generated based on the state information.

Figure 8:
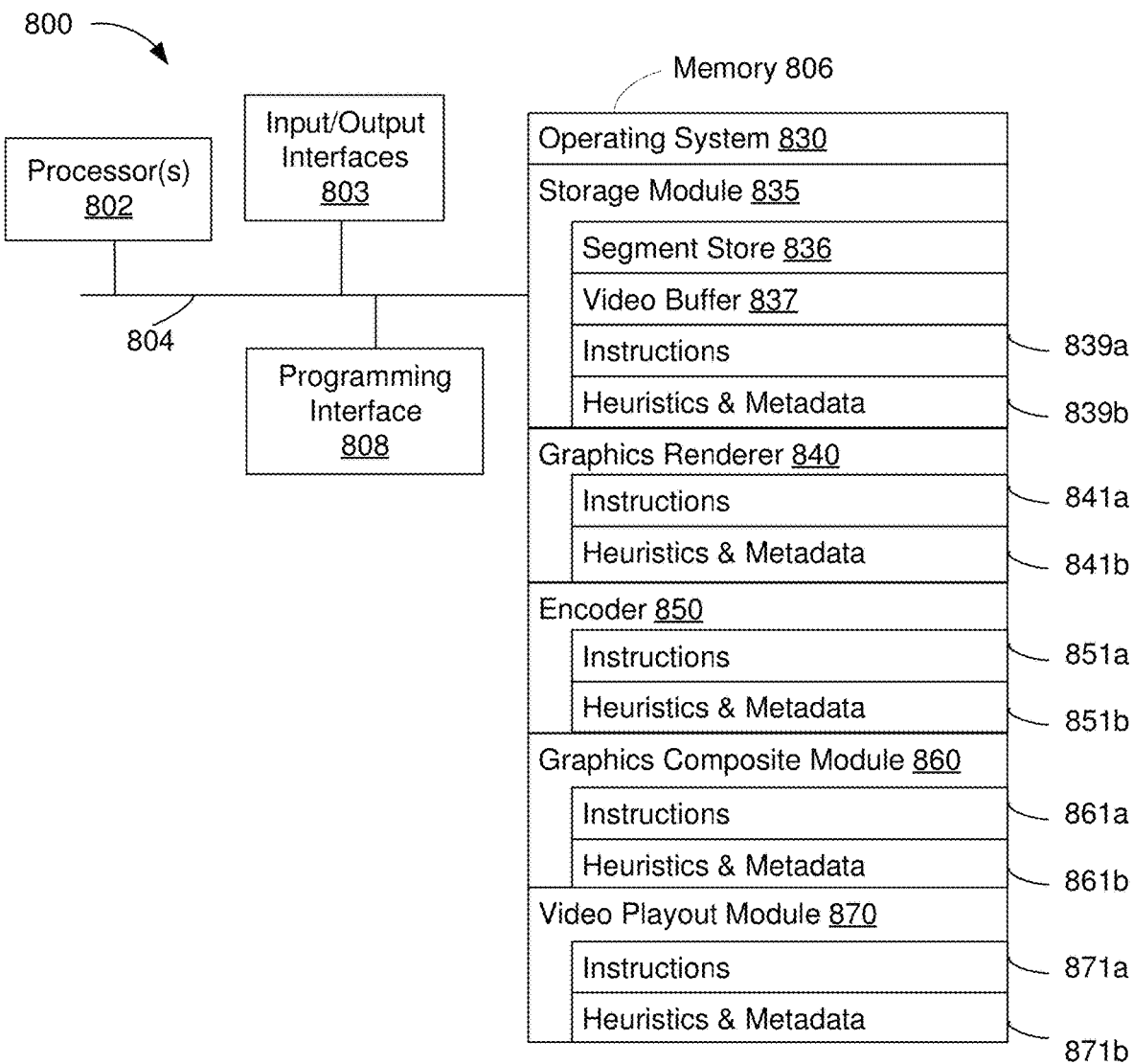
FIG. 8 is a block diagram of a computing device for cloud UI rendering in the exemplary virtual set top system, in accordance with some embodiments.

FIG. 8 is a block diagram of a computing device 800 in an exemplary virtual set top system for UI rendering in accordance with some embodiments. In some embodiments, the computing device 800 corresponds to one of the UI engines 40 in FIGS. 1 and 3-6 and performs one or more of the functionalities described above with respect to the UI engine. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units or processors 802 (e.g., CPUs and/or GPUs), one or more input/output interfaces 803 (e.g., input devices, sensors, a network interface, a display, etc.), a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the processor(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a storage module 835, a graphics renderer 840, an encoder 850, a graphics composite module 860, and a video playout module 870. In some embodiments, one or more instructions are included in a combination of logic and non-transitory memory. The operating system 830 includes procedures for handling various basic system services and for performing hardware dependent tasks.

In some embodiments, the storage module 835 is configured to provide storage for UI rendering, including a segment store 836 (e.g., the segment store 50 in FIGS. 1, 3, 5, and 6) for storing rendering UI objects and a video buffer 837 (e.g., the video buffer 70 in FIGS. 1 and 4) for storing a plurality of video frames. To that end, the storage module 835 includes a set of instructions 839a and heuristics and metadata 839b.

In some embodiments, the graphics renderer 840 (e.g., the graphics renderer 42 in FIGS. 1, 3, and 4) is configured to render one or more UI elements to one or more UI objects. To that end, the graphics renderer 840 includes a set of instructions 841a and heuristics and metadata 841b.

In some embodiments, the encoder 850 (e.g., the encoder 44 in FIGS. 1 and 3) is configured to encode the rendered UI objects into frames for video playout. To that end, the encoder 850 includes a set of instructions 851a and heuristics and metadata 851b.

In some embodiments, the graphics composite module 860 (e.g., the graphics composite 46 in FIGS. 1 and 4) is configured to composite UIs with ABR videos for video playout. To that end, the graphics composite module 860 includes a set of instructions 861a and heuristics and metadata 861b.

In some embodiments, the video playout module 870 (e.g., the video playout 48 in FIGS. 1, 3, and 4) is configured to play out the video to the client and/or record a video sequence corresponding to the cloud rendered UI for caching. To that end, the video playout module 870 includes a set of instructions 871a and heuristics and metadata 871b.

Although the storage model 835, the graphics renderer 840, the encoder 850, the graphics composite module 860, and the video playout module 870 are illustrated as residing on a single computing device 800, it should be understood that in other embodiments, any combination of the graphics renderer 840, the encoder 850, the graphics composite module 860, and the video playout module 870 can reside in separate computing devices in various embodiments. For example, in some embodiments, each of the graphics renderer 840, the encoder 850, the graphics composite module 860, and the video playout module 870 resides on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a server including one or more processors and a non-transitory memory, wherein the non-transitory memory includes a cache for storing rendered TV user interfaces (UIs) for multiple watch sessions of streaming media content:
receiving a first request from a first client device for a TV UI, wherein the first request includes a first state of a first watch session at the first client device, and the first state is associated with the TV UI and the first request;
identifying, based at least in part on the first state, at least one of one or more UI elements or one or more interactions associated with the TV UI in the first watch session;
determining whether or not one or more UI objects corresponding to at least one of the one or more UI elements or the one or more interactions for a transition to the TV UI exist in the cache;
generating the transition to the TV UI using the one or more UI objects in accordance with a determination that the one or more UI objects exist in the cache, wherein the one or more UI objects include one or more encoded video frames corresponding to the transition to the TV UI;
rendering and encoding the transition to the TV UI into a video in accordance with a determination that the one or more UI objects do not exist in the cache, including rendering at least one of the UI elements or the one or more interactions as the one or more UI objects and storing the one or more UI objects in the cache; and
playing the video to the first client device during the first watch session.

2. The method of claim 1, wherein the one or more UI elements include one or more static UI elements, and the one or more static UI elements and the one or more interactions are common to a plurality of watch sessions.

3. The method of claim 1, wherein the one or more UI elements include one or more active UI elements personal to a user, and the one or more active UI elements and the one or more interactions are repeatedly requested by the user.

4. The method of claim 1, wherein storing the one or more UI objects in the cache includes:
deriving from the first state a user requesting the TV UI, a screen associated with the TV UI, a UI element highlighted on the screen, and an input key triggering the first request; and
indexing the one or more UI objects in the cache based on a composite of the user requesting the TV UI, the screen associated with the TV UI, the UI element highlighted on the screen, and the input key triggering the first request.

5. The method of claim 4, wherein generating the transition to the TV UI using the one or more UI objects in accordance with the determination that the one or more UI objects exist in the cache includes:
obtaining the one or more UI objects from the cache using the composite of the user requesting the TV UI, the screen associated with the TV UI, the UI element highlighted on the screen, and the input key triggering the first request; and
providing the one or more UI objects for video playout of the TV UI.

6. The method of claim 1, wherein:
storing the one or more UI objects in the cache includes:
determining whether the video is cacheable based at least in part on the first state; and
storing the video in the cache in accordance with a determination that the video is cacheable.

7. The method of claim 6, further comprising:
determining playout characteristics of the video based at least in part on the first state; and
composing the video according to the playout characteristics.

8. The method of claim 1, further comprising:
determining whether or not the TV UI is associated with the video; and
compositing the TV UI with a plurality of frames in the video in accordance with a determination that the UI is associated with the video.

9. The method of claim 8, wherein compositing the TV UI with the video includes:
- identifying a first insertion point in the plurality of frames based on the first state;
- overlaying the one or more UI objects over the plurality of frames obtained from a video buffer starting from the first insertion point.

10. The method of claim 9, further comprising:
- receiving a second request from a second client device for the TV UI, wherein the second request includes a second state of a second watch session at the second client device, and the second state is associated with the TV UI and the second request;
- in response to receiving the second request, identifying a second insertion point in the plurality of frames based on the second state and overlaying the one or more UI objects over the plurality of frames obtained from the video buffer starting from the second insertion point.

11. A system comprising:
- one or more processors;
- a non-transitory memory, wherein the non-transitory memory includes a cache for storing rendered TV user interfaces (UIs) for multiple watch sessions of streaming media content; and
- one or more programs stored in the non-transitory memory, which, when executed, cause the one or more processors to perform operations comprising:
  - receiving a first request from a first client device for a TV UI, wherein the first request includes a first state of a watch session at the first client device, and the first state is associated with the TV UI and the first request;
  - identifying, based at least in part on the first state, at least one of one or more UI elements or one or more interactions associated with the TV UI in the first watch session;
  - determining whether or not one or more UI objects corresponding to at least one of the one or more UI elements or the one or more interactions for a transition to the TV UI exist in the cache;
  - generating the transition to the TV UI using the one or more UI objects in accordance with a determination that the one or more UI objects exist in the cache, wherein the one or more UI objects include one or more encoded video frames corresponding to the transition to the TV UI;
  - rendering and encoding the transition to the TV UI into a video in accordance with a determination that the one or more UI objects do not exist in the cache, including rendering at least one of the UI elements or the one or more interactions as the one or more UI objects and storing the one or more UI objects in the cache; and
  - playing the video to the first client device during the first watch session.

12. The system of claim 11, wherein the one or more UI elements include one or more static UI elements, and the one or more static UI elements and the one or more interactions are common to a plurality of watch sessions.

13. The system of claim 11, wherein the one or more UI elements include one or more active UI elements personal to a user, and the one or more active UI elements and the one or more interactions are repeatedly requested by the user.

14. The system of claim 11, wherein storing the one or more UI objects in the cache includes:
- deriving from the first state a user requesting the TV UI, a screen associated with the TV UI, a UI element highlighted on the screen, and an input key triggering the first request; and
- indexing the one or more UI objects in the cache based on a composite of the user requesting the TV UI, the screen associated with the TV UI, the UI element highlighted on the screen, and the input key triggering the first request.

15. The system of claim 14, wherein generating the transition to the TV UI using the one or more UI objects in accordance with the determination that the one or more UI objects exist in the cache includes:
- obtaining the one or more UI objects from the cache using the composite of the user requesting the TV UI, the screen associated with the TV UI, the UI element highlighted on the screen, and the input key triggering the first request; and
- providing the one or more UI objects for video playout of the TV UI.

16. The system of claim 11, wherein:
- storing the one or more UI objects in the cache includes:
  - determining whether the video is cacheable based at least in part on the first state; and
  - storing the video in the cache in accordance with a determination that the video is cacheable.

17. The system of claim 16, wherein the operations further comprise:
- determining playout characteristics of the video based at least in part on the first state; and
- composing the video according to the playout characteristics.

18. The system of claim 11, wherein the operations further comprise:
- determining whether or not the TV UI is associated with the video; and
- compositing the TV UI with a plurality of frames in the video in accordance with a determination that the UI is associated with the video.

19. The system of claim 18, wherein compositing the TV UI with the video includes:
- identifying a first insertion point in the plurality of frames based on the first state;
- overlaying the one or more UI objects over the plurality of frames obtained from a video buffer starting from the first insertion point.

20. The system of claim 19, wherein the operations further comprise:
- receiving a second request from a second client device for the TV UI, wherein the second request includes a second state of a second watch session at the second client device, and the second state is associated with the TV UI and the second request;
- in response to receiving the second request, identifying a second insertion point in the plurality of frames based on the second state and overlaying the one or more UI objects over the plurality of frames obtained from the video buffer starting from the second insertion point.

* * * * *